United States Patent
James, Jr.

(10) Patent No.: US 6,299,094 B1
(45) Date of Patent: Oct. 9, 2001

(54) APPARATUS FOR APPLYING AND RETRIEVING PROTECTIVE GROUND COVERINGS

(75) Inventor: Forrest Hood James, Jr., Lanier Ford Shaver & Payne, P.C., P.O. Box 2087, Huntsville, AL (US) 35804

(73) Assignee: Forrest Hood James, Jr., Rutledge, AL (US)

( * ) Notice: Subject to any disclaimer, the term of this patent is extended or adjusted under 35 U.S.C. 154(b) by 0 days.

(21) Appl. No.: 09/397,574

(22) Filed: Sep. 16, 1999

(51) Int. Cl.[7] .............................. B65H 75/48; B65H 75/34
(52) U.S. Cl. ...................... 242/390; 242/391; 242/391.3; 242/397; 242/399.1; 242/919
(58) Field of Search .................................... 242/390, 391, 242/391.1, 391.2, 391.3, 397, 390.2, 390.4, 403, 399.1, 919

(56) References Cited

U.S. PATENT DOCUMENTS

| | | |
|---|---|---|
| 987,593 | 3/1911 | O'Maley . |
| 1,550,082 | 8/1925 | Lintz et al. . |
| 2,616,636 * | 11/1952 | Aden . |
| 3,403,870 * | 10/1968 | Garaboux . |
| 3,473,755 | 10/1969 | Brown . |
| 3,481,556 * | 12/1969 | McDonnell . |
| 3,880,305 * | 4/1975 | Van Polen . |
| 3,913,854 * | 10/1975 | McClure . |
| 4,024,970 * | 5/1977 | Schirer . |
| 4,044,963 * | 8/1977 | Hostetler . |
| 4,049,140 * | 9/1977 | Roose . |
| 4,084,763 | 4/1978 | Zamboni . |
| 4,253,619 | 3/1981 | Corderoy et al. . |
| 4,280,777 * | 7/1981 | Gray . |
| 4,339,096 * | 7/1982 | May . |
| 4,494,707 * | 1/1985 | Niibori et al. . |
| 4,513,530 | 4/1985 | Nyboer . |
| 4,555,073 * | 11/1985 | Barazone . |
| 4,632,329 | 12/1986 | Burley . |
| 4,742,970 * | 5/1988 | Barazone . |
| 4,754,815 * | 7/1988 | Brouwer et al. . |
| 5,215,278 * | 6/1993 | Hess . |
| 5,304,014 | 4/1994 | Slutz . |
| 5,524,302 * | 6/1996 | Ragsdale et al. . |
| 5,536,116 | 7/1996 | Lammers et al. . |
| 5,620,281 | 4/1997 | Lammers et al. . |
| 5,709,351 * | 1/1998 | Osborn et al. . |
| 5,897,073 * | 4/1999 | McVaugh . |

FOREIGN PATENT DOCUMENTS

| | | | |
|---|---|---|---|
| 3838628 * | 5/1990 | (DE) | ...................................... 242/557 |
| 2129462 * | 5/1984 | (GB) | ...................................... 242/397 |

* cited by examiner

Primary Examiner—William A. Rivera
(74) Attorney, Agent, or Firm—Lanier Ford Shaver & Payne, P.C.; Gerald M. Walsh; Frank M. Caprio

(57) ABSTRACT

A cover reel assembly for laying or retrieving a ground cover comprising a first frame attachable to a prime mover, the first frame having pivotal support arms attached rotatably to a cover reel and attached fixedly to a second frame, with a hydraulic device between the first frame and pivotal support arms to raise and lower the cover reel and second frame, the second frame being attached to a third frame having a brush/guide mechanism. The prime mover pushes the cover reel assembly forward with downward pressure from the hydraulic device on the cover reel to unwind a ground cover from the cover reel onto the ground, simultaneously laying cables from cable reels as retainers on the ground cover, with the cable reels attached to the first frame. The ground cover and cables are rewound by a reverse procedure pushing the cover reel assembly forward. In an alternate embodiment the three frames are arranged so that the prime mover can pull the cover reel assembly for laying or retrieving the ground cover and retaining cables.

40 Claims, 9 Drawing Sheets

APPARATUS FOR APPLYING AND RETRIEVING PROTECTIVE GROUND COVERINGS

BACKGROUND OF THE INVENTION

1. Field of the Invention

This invention relates generally to machines for laying down and taking up ground covers using reels and particularly to a machine that lays down a ground cover on a road, secures the cover to the road, and takes up the cover for reuse.

2. Description of the Prior Art

Numerous machines have been described which use reel mechanisms to lay down covers on the ground and take them up. Some of these have been for covering baseball fields, football fields, new-laid concrete, winter recreation surfaces, and land fills. Some machines have been described for laying down or taking up plastic piping or grass turf. In those machines, the cover reels cannot raise or lower the cover reel, do not operate with the cover reel on the ground, or do not have a means of pressing the cover reel on the ground. In addition, they may have no means to secure the cover on the ground. Some of these machines may have a high degree of mechanical complexity or require a built-in prime mover.

There exists a need for a practical cover reel assembly that can apply and fasten a cover to a road construction site quickly to protect it from weather and other environmental conditions, and retrieve the cover for reuse. The cover needs to be aligned accurately on the road by uniformly pressing the cover onto the road as the cover is unwound from a reel. The present invention provides a novel, practical means for meeting these needs.

SUMMARY OF INVENTION

The present invention is an apparatus for laying down or retrieving a ground cover. The apparatus is useful for laying a cover over a road or highway to protect the road or highway from weather and other exposure. It is also useful for protecting road construction sites, road preparation sites, and excavation sites, and road beds prior to laying asphalt or concrete. The cover can then be retrieved by the apparatus when there is no longer a need to cover the road or highway. In one embodiment, the invention has a first frame which can be attached to a prime mover such as a forklift or tractor. The first frame has pivotal support arms which are attached to a second frame and a cover reel. Hydraulic means are also connected between the first frame and pivot support arms to raise and lower the cover reel and second frame. Alternatively, the hydraulic means are positioned between the prime mover and first frame. Cable reels with a motor/transmission assembly are located on the first frame. A third frame is attached to the second frame and contains a brush and guide mechanism for the cover.

The cover on the reel can be lowered to the ground and laid onto the road by the action of the prime mover pushing the cover reel forward, freely unwinding the cover. The cables will unwind freely from behind the unit and serve to hold the cover in a fixed position on the ground. A downward pressing force can be applied to the cover reel by the action of the hydraulic means to facilitate unwinding and alignment of the cover on the ground. The cover can be rewound and taken up through the brush/guide mechanism and onto the cover reel by a reverse process. The cover is passed through the brush/guide mechanism and attached to the cover reel. The cover reel is then pushed forward by the prime mover, winding up the cover as the cover reel rotates. Simultaneously, the cables are rewound on the cable reels by action of the cable reel motor/transmission assembly. In both procedures of laying down or taking up the cover, downward pressing force can be applied to the cover reel by the hydraulic means to facilitate winding, unwinding, and alignment of the cover on the ground or on the cover reel.

In an alternative embodiment, the invention has a first frame which can be attached to a prime mover. A second frame is attached rotatably to the first frame and a third frame is attached rotatably to the second frame. Hydraulic means are connected between the first and second frames to raise and lower the second frame. The second frame contains a cover reel with a cover which is wound or unwound by a motor/transmission assembly connected to the first frame. The second frame also contains a brush/guide mechanism. The third frame contains a motor/transmission assembly which winds or unwinds cables from cable reels connected to the third frame. There is a hydraulic means between the first and third frames to raise and lower the third frame. In this embodiment, the cover is laid down by pulling the unit on the ground behind the prime mover. The cover and cables are attached to one end of the ground and unwind freely as the unit is pulled away. The cover is taken up through the brush/guide assembly by pulling the unit behind the prime mover. The cables are taken up by activating the motor/tansmision assembly. The cover can also be taken up by activating the cover reel motor/transmission assembly. In both procedures of laying down or taking up the cover, downward pressing force can be applied to the cover reel by the hydraulic means to facilitate winding, unwinding, and alignment of the cover on the ground or on the cover reel.

The downward pressing force of the present invention makes it possible to lay the cover quickly and accurately.

One object of the present invention is to provide a cover reel assembly that can apply and fasten a cover to the ground at a rate not less than 1,000 feet per minute.

Another object of the present invention is to provide a cover reel assembly that can take up a cover and fastening means from the ground at a rate not less than 1,000 feet per minute.

A further object of the present invention is to provide a cover reel assembly that employs a cover reel on the ground and that can apply a downward pressing force on the reel to facilitate winding, unwinding and alignment of the cover on the ground or on the cover reel.

A yet further object of the present invention is to provide a cover reel assembly that can lay down the cover and fastening means by pushing the cover reel.

Still a further object of the present invention is to provide a cover reel assembly that can lay down and take up the cover and fastening means by pulling the cover reel.

DETAILED DESCRIPTION OF THE PREFERRED EMBODIMENTS

Figure 7:
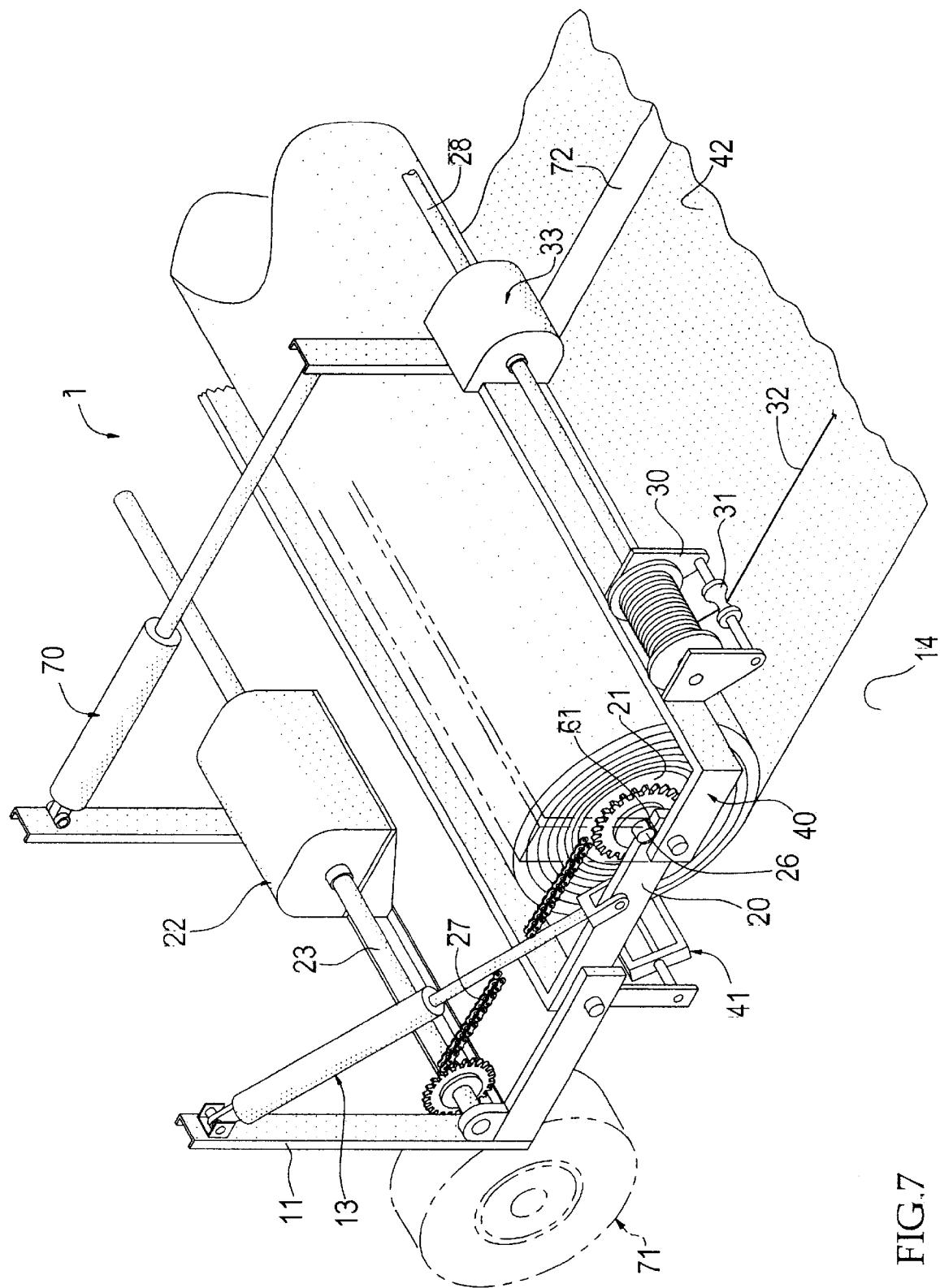
FIG. 7 shows another embodiment of a cover reel apparatus in the lay down position whereby the cover reel apparatus is pulled on the ground.
Figure 8:
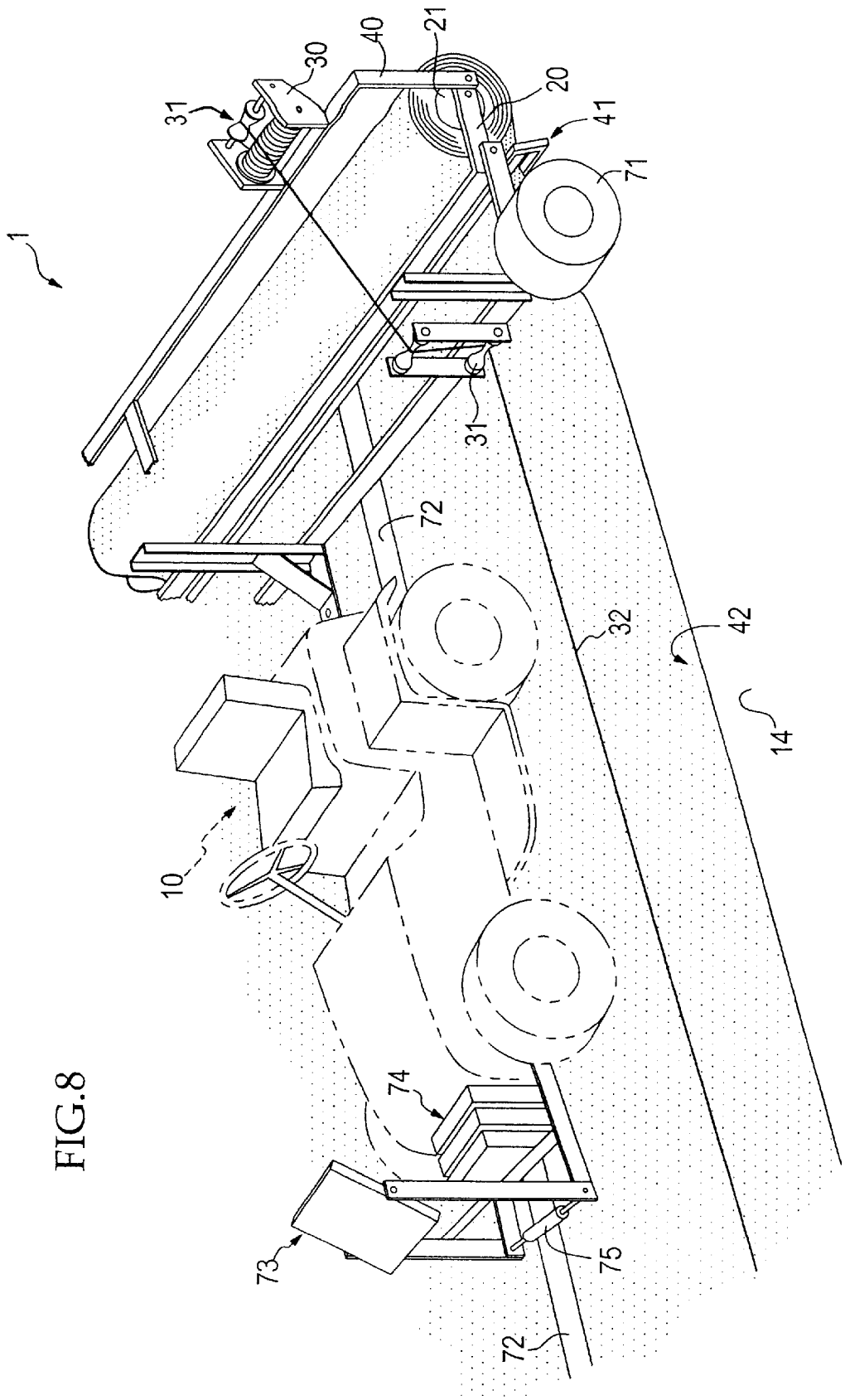
FIG. 8 shows the same embodiment in FIG. 7, but in the take up position whereby the cover reel apparatus is pulled on the ground.

While the following description details the preferred embodiments of the present invention, it is to be understood that the invention is not limited in its application to the details of construction and arrangement of the parts illustrated in the accompanying drawings, since the invention is capable of other embodiments and of being practiced in various ways. The preferred embodiments of the present invention provide an apparatus for applying and retrieving ground coverings by pushing a cover reel as shown in FIGS. 1–6 or pulling a cover reel as shown in FIGS. 7 and 8.

Figure 1:
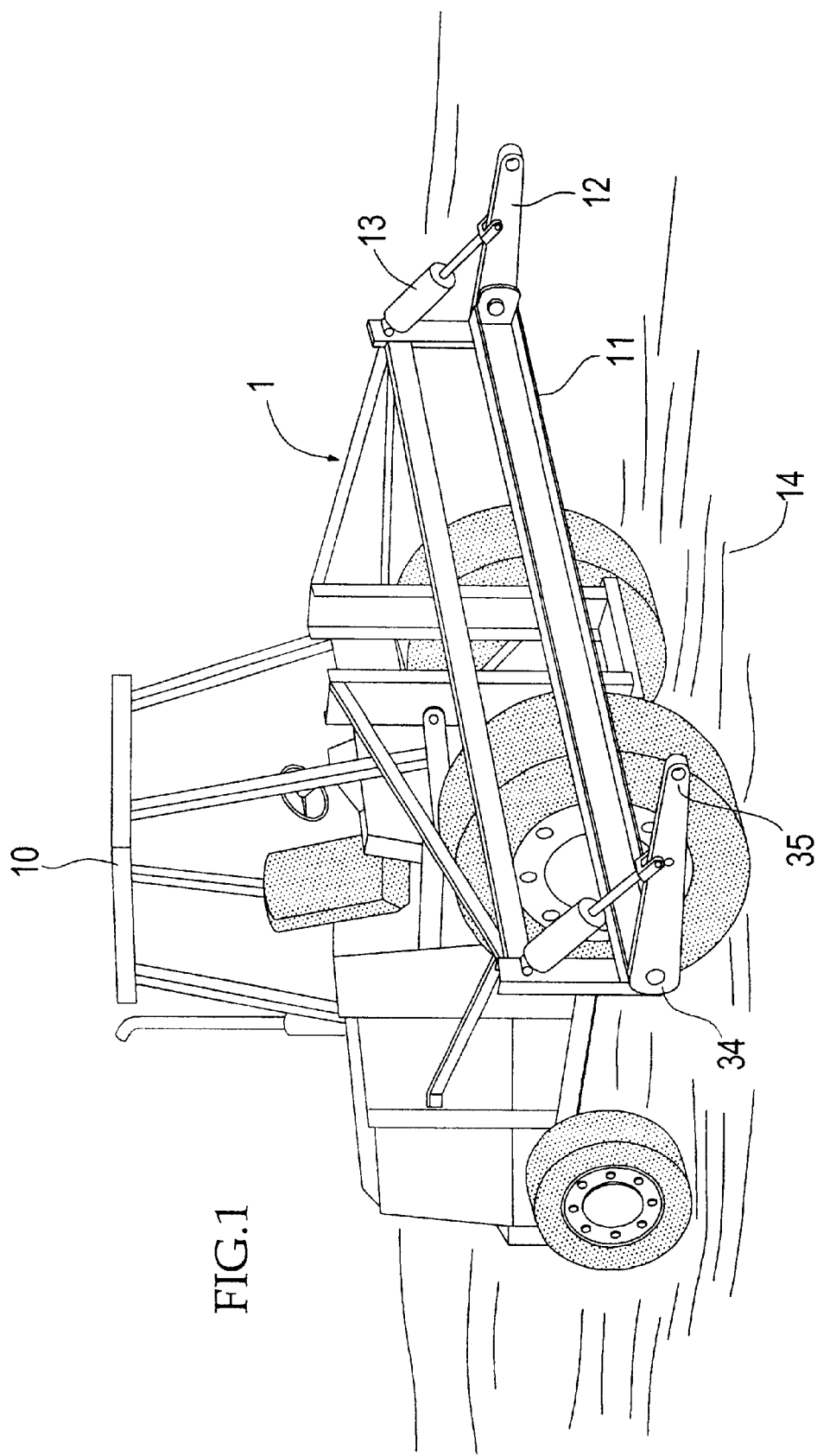
FIG. 1 shows a perspective view of a first frame of the cover reel apparatus attached to a prime mover.

FIG. 1 shows a first frame 11 of the cover reel assembly 1 attached to a prime mover 10 which can push the assembly. First frame 11 has pivotal support arms 12, having a proximal end 34 and a distal end 35. In between frame 11 and pivotal support arm 12 are means 13 for raising and lowering pivotal support arms 12. Preferably, the raising and lowering means are hydraulic means, but may also include pneumatic means and other mechanical means such as various motor and shaft assemblies known in the art.

Figure 2:
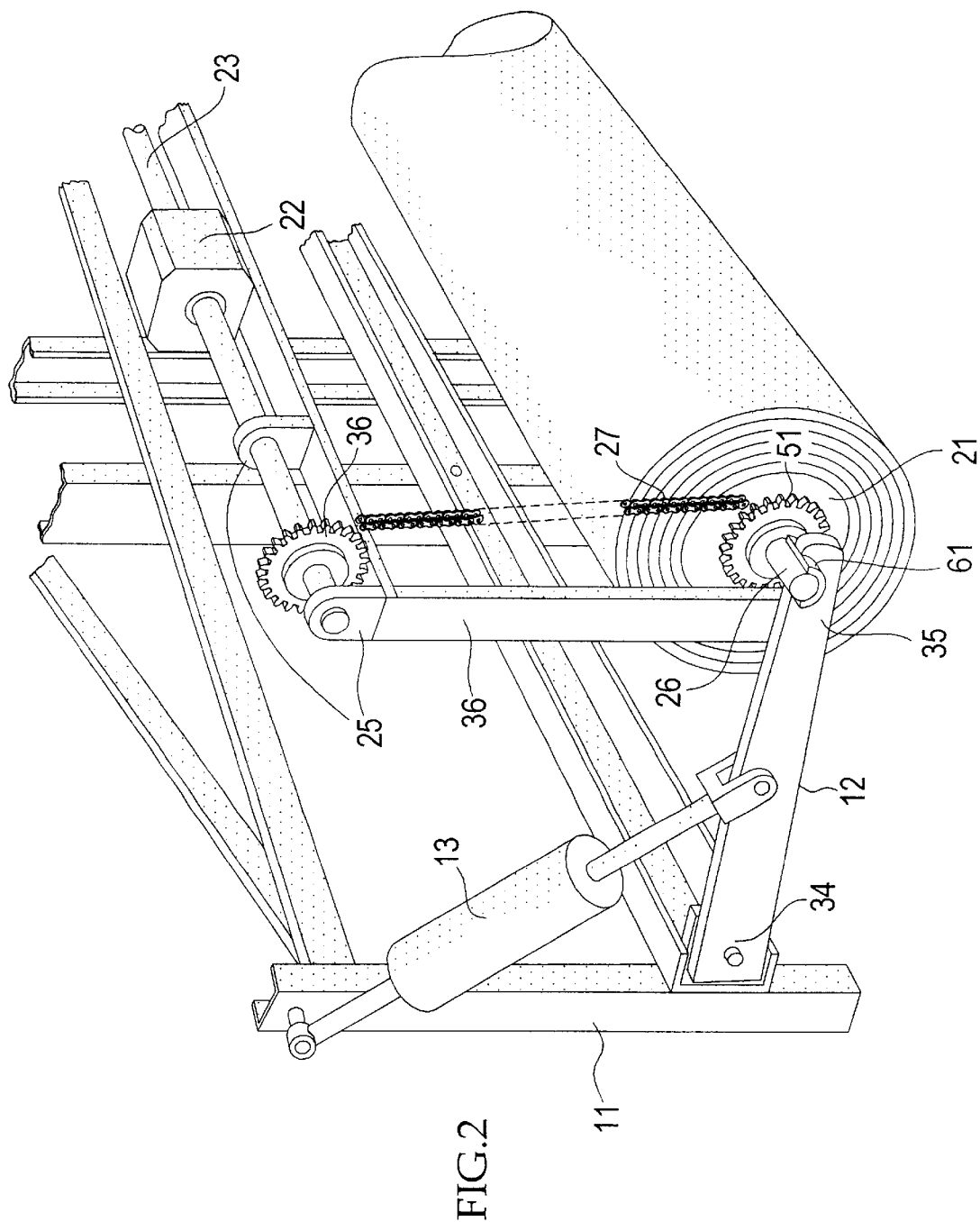
FIG. 2 shows a second frame of the cover reel apparatus attached to the first frame, including the cover reel and hydraulic means to lift the cover reel.

FIG. 2 shows one half of the cover reel assembly, since the assembly is symmetrical. Proximal end 34 of pivotal support arm 12 is attached rotatably to first frame 11. At distal end 35 of pivotal support arm 12, a cover reel 21 is rotatably mounted by means of removable cover reel end assembly 26 in bushing assembly 61. Bushing assembly 61 is a split bushing assembly where FIG. 2 shows only a bottom portion. Distal end 35 of pivotal support arm 12 has means for attaching an upper portion of the bushing assembly 61 (not shown) such that roller bearing 52 (shown in FIG. 5) of removable cover reel end assembly 26 is completely removably encased in bushing assembly 61.

A second frame 20 is connected by rigid attachment to pivotal support arm distal end 35. Second frame 20 extends above cover reel 21. When the pivotal arms are raised or lowered by hydraulic means 13, second frame 20 and cover reel 21 are also raised and lowered simultaneously. Cover reel motor and transmission 22 are mounted on second frame 20, with a common shaft 23 extending to either end of the frame and supported by pilar blocks 25. Sprockets 36 are mounted on both ends of shaft 23, and connect to sprockets 51 on removable cover reel end assembly 26 by chains 27 or other driving means. Cover reel motor and transmission 22 have a means for disengaging shaft 23 so that cover reel 21 may rotate freely.

Figure 3:
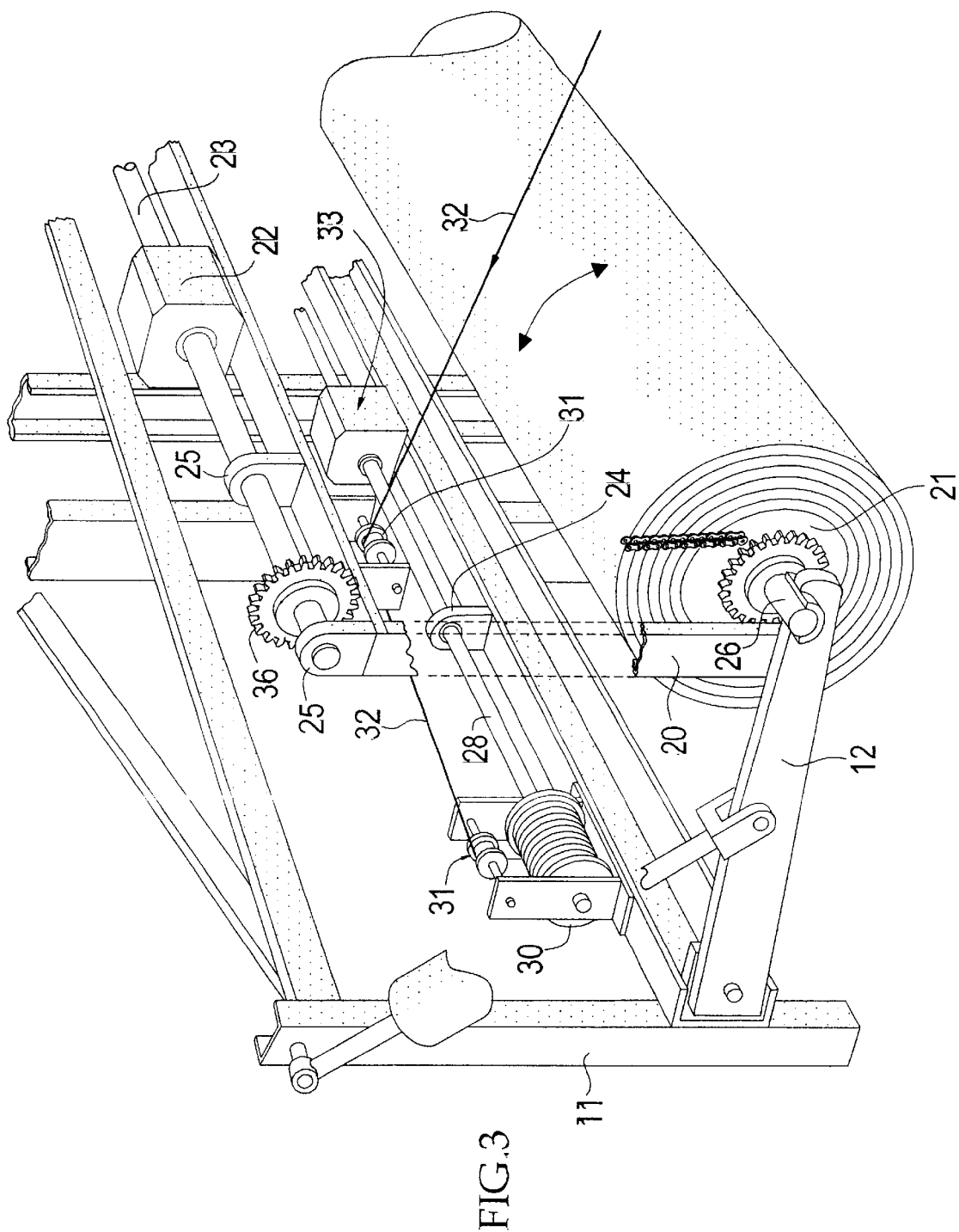
FIG. 3 shows the first and second frames with the cable reel assembly.

FIG. 3 shows additionally cable reels 30 rigidly mounted on either end of frame 11. The cable reels 30 have guide spools 31. The second frame 20 also has guide spools 31. A cable reel motor and transmission 33 is mounted on first frame 11 with a common shaft 28 extending to each cable reel 30 and supported by pilar blocks 24. Cable reel motor and transmission 33 have a means for disengaging shaft 23 so that cable reel 30 may rotate freely.

Figure 4:
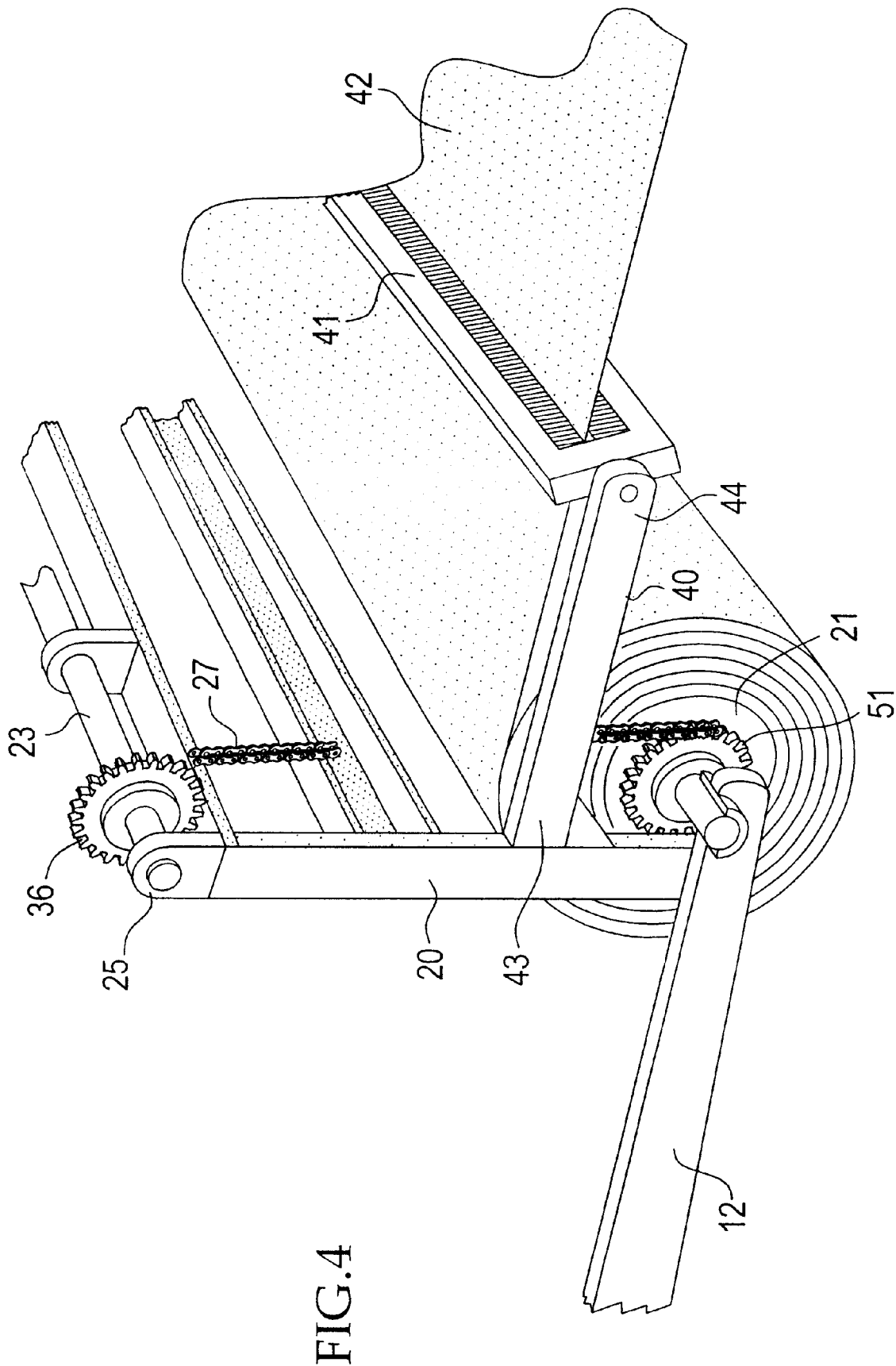
FIG. 4 shows a third frame attached to the second frame with a brush/guide assembly attached to the third frame.

FIG. 4 shows a third frame 40 rigidly attached to second frame 20 at proximal end 43 and extending outward from second frame 20 to distal end 44. Brush/guide mechanism 41 is attached to third frame 40 at distal ends 44. Cover 42 can be inserted through brush/guide mechanism 41 during rewinding and uptake of cover 42. The brush/guide mechanism 41 helps align cover 42 onto cover reel 21 and removes debris from cover 42 during retrieval and uptake of cover 42.

Figure 5A:
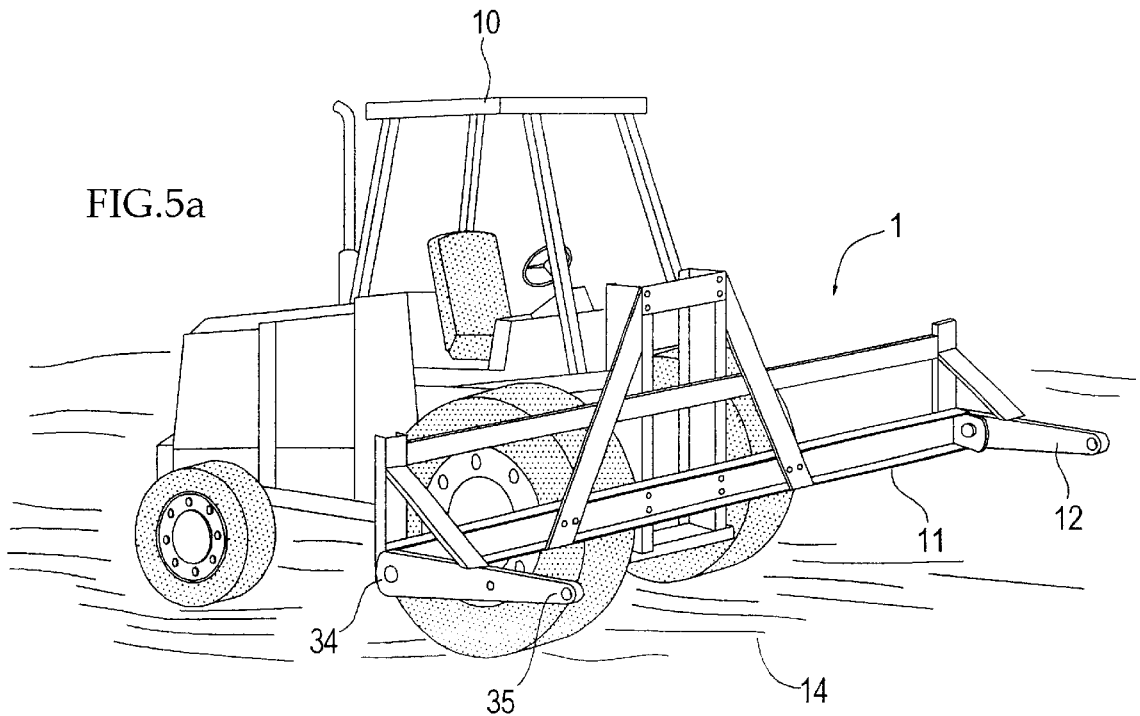
FIGS. 5a and 5b show another embodiment of a cover reel apparatus where the hydraulic means for applying downward pressure on the cover reel are located between the cover reel apparatus and the prime mover.
Figure 5B:
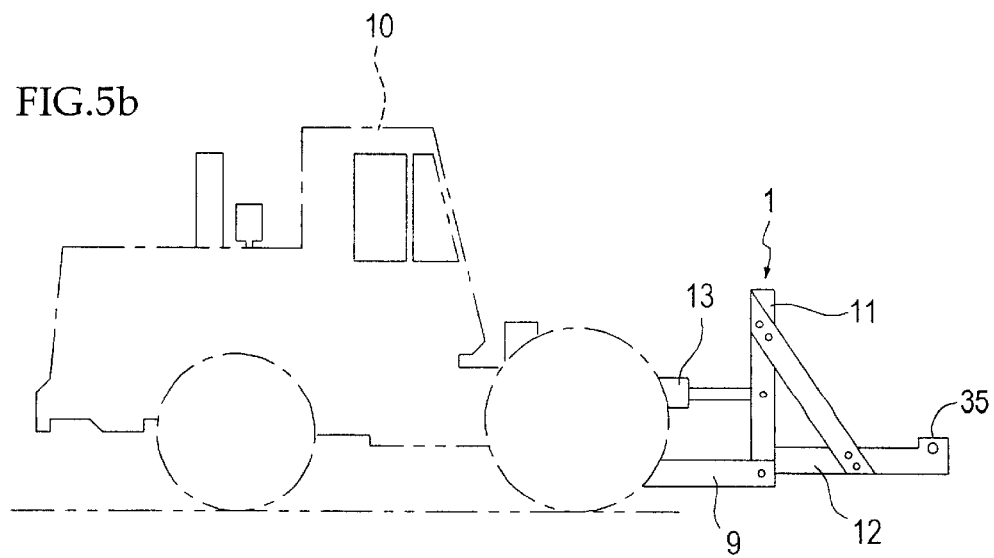

FIGS. 5a and 5b show another embodiment of the present invention. In this simplified version, cover reel assembly 1 is attached rotatably to prime mover 10 by brace extensions 9. Raising and lowering means 13, preferably hydraulic means, are positioned between prime mover 10 and cover reel assembly 1. Hydraulic means 13 are rotatably attached to frame 11 and pivotal support arms 12 are attached fixedly to frame 11 so that when hydraulic means 13 are extended, frame 11 rotates forward and downward, applying a downward pressure on cover reel 21. This embodiment otherwise incorporates all the features shown and described in FIGS. 1 through 4.

Figure 6A:
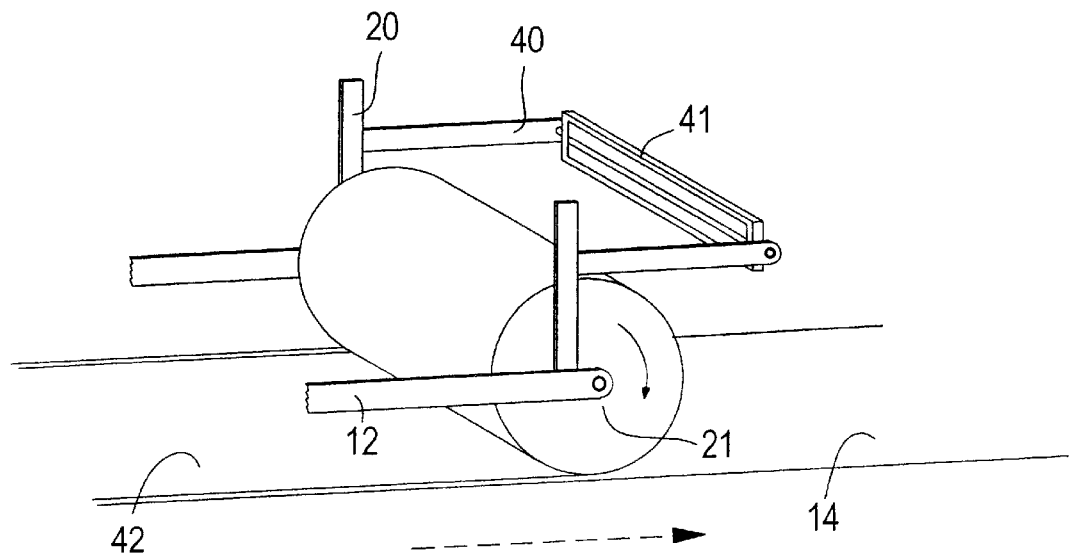
FIGS. 6a and 6b show one embodiment of the method of laying down and taking up a cover and fastening means, whereby laying down of the cover is produced by pushing the cover reel on the ground.
Figure 6B:
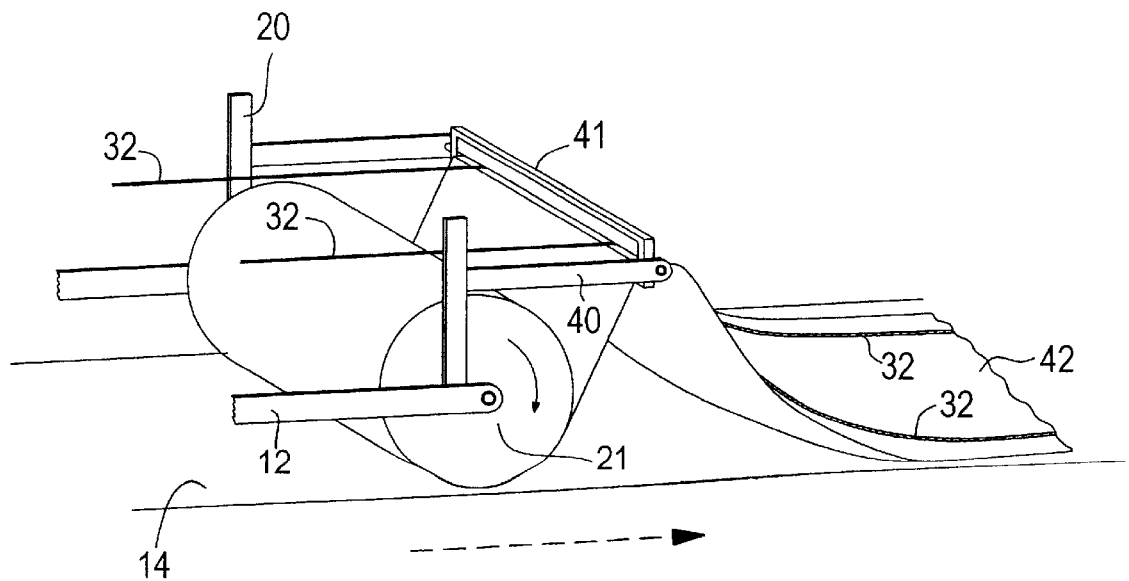

FIGS. 6a and 6b show how the embodiments of the present invention described in FIGS. 1–5 can be used to lay down and take up a cover 42 on a road surface 14. In FIG. 6a, cover 42 and cables 32 (see FIG. 3) are attached to the ground and prime mover 10 (see FIG. 1) is on the surface of cover 42. Cover reel 21 is lowered to road surface 14 by hydraulic means 13 (see FIGS. 1 and 2) attached to pivotal arms 12. The prime mover 10 pushes the cover reel 21 forward, shown by the dashed arrow, unwinding cover 42 freely, shown by the solid arrow, and laying it onto road surface 14. Downward pressure on the cover reel facilitates a rapid, even, uniform, and aligned laying-down of the cover on the ground. The weight of the cover reel itself may provide this downward pressing force. Additional downward, pressing force can be applied by the hydraulic means 13 to forcibly press the cover reel 21 onto the road surface 14. Simultaneously, cables 32 are freely unwinding from cable reels 30 (see FIG. 3) from behind first frame 11 (see FIG. 3). As the cables 32 unwind they lay on the surface of cover 42 and serve to hold cover 42 in a secured fixed retained position on road surface 14.

FIG. 6b shows how cover 42 is taken up and rewound on cover reel 21. A free end of cover 42 is inserted through brush/guide mechanism 41 and then attached to cover reel 21. Cables 32 are threaded through guide spools 31 on second frame 20 and cables 32 are attached to cable reels 30. The prime mover 10 pushes cover reel 21 forward, shown by the dashed arrow, thereby winding cover 42 onto cover reel 21, shown by the solid arrow. Additional downward, pressing force can be applied by the hydraulic means 13 to forcibly press the cover reel 21 onto the road surface 14. Simultaneously, cable reel motor and transmission 33 are activated to turn shaft 28 and cable reels 30 thereby winding cables 32 onto cable reels 30 (See FIG. 3).

FIG. 7 shows yet another embodiment of the present invention whereby the cover reel assembly 1 is pulled by the prime mover 10 to lay down the ground cover 42, facilitated by ground support wheels 71. The first frame 11 is connected to a prime mover 10. The first frame 11 has a cover reel motor and transmission 22 with a common shaft 23 extending to either end of first frame 11. Sprockets 36 are mounted on both ends of shaft 23, and connect to sprockets 51 on removable cover reel end assembly 26 by chains 27 or other driving means. Cover reel motor and transmission 22 have a means for disengaging shaft 23 so that cover reel 21 may rotate freely. First frame 11 has a second frame 20 mounted rotatably to first frame 11. In between first frame 11 and second frame 20 are hydraulic means 13 to raise and lower second frame 20. Cover reel 21 is mounted rotatably to second frame 20 by means of removable cover reel end assembly 26 seated removably in bushing assembly 61. Second frame 20 also has a brush/guide mechanism 41 mounted rotatably to second frame 20. A third frame 40 is mounted rotatably to second frame 20 and has cable reels 30 with cables 32 and guide spools 31. Third frame 40 also has a cable reel motor and transmission 33 with a common shaft 28 extending to each cable reel 30. Cable reel motor and transmission 33 have a means for disengaging shaft 28 so that cable reels 30 may rotate freely. A hydraulic means 70 is located between first frame 11 and third frame 40 to raise and lower third frame 40. To lay down ground cover 42 cover reel 21 is laid on the ground by hydraulic means 13. Additional downward force can be applied by hydraulic means 13 to forcibly press cover reel 21 onto the road surface 14. Prime mover 10 pulls the cover reel 42 forward, unwinding cover 42 freely and laying it onto road surface 14. Additional downward force by hydraulic means 13 facilitates and ensures an even, uniform and aligned laying down of cover 42 on road surface 14. Simultaneously, cables 32 are freely unwinding from cable reels 30 from third frame 40. As the cables 32 unwind they lay on the surface of cover 42 and serve to hold cover 42 in a secured fixed retained position on road surface 14.

FIG. 8 shows the cover reel assembly of FIG. 7 in the take up position. One end of cover reel 42 is passed through brush guide mechanism 41 and attached to cover reel 21. Cables 32 are passed through guide spools 31 on first frame 11 and on cable reel 30 and attached to cable reel 30. Prime mover 10 is on the surface of ground cover 42 and pulls cover reel assembly 1 towards the free end of cover 42 in order to rewind cover 42 on cover reel 21. In order to facilitate alignment of rewinding cover 42 on cover reel 21, cover reel 21 is placed on the ground and a downward pressing force is applied to cover reel 21 by hydraulic means 13. In addition, prime mover 10 may have a mirror assembly 73 which visualizes a yellow center line 72 on the surface of cover 42 and a roller guide 75 which can be made to follow yellow center line 72 to ensure proper alignment of cover 42 on cover reel 21 during take up. Simultaneously, third frame 40 is elevated by hydraulic means 70 above cover reel 21, and cable reel motor and transmission 33 is activated to wind up cables 32 on cable reel 30.

Alternatively, cover reel 21 may be elevated above ground 14 and activated by cover reel motor and transmission 33 to take up cover 42, as prime mover 10 pulls cover reel assembly 1 towards the free end of cover 42.

Figures 9A, 9B, 9C:
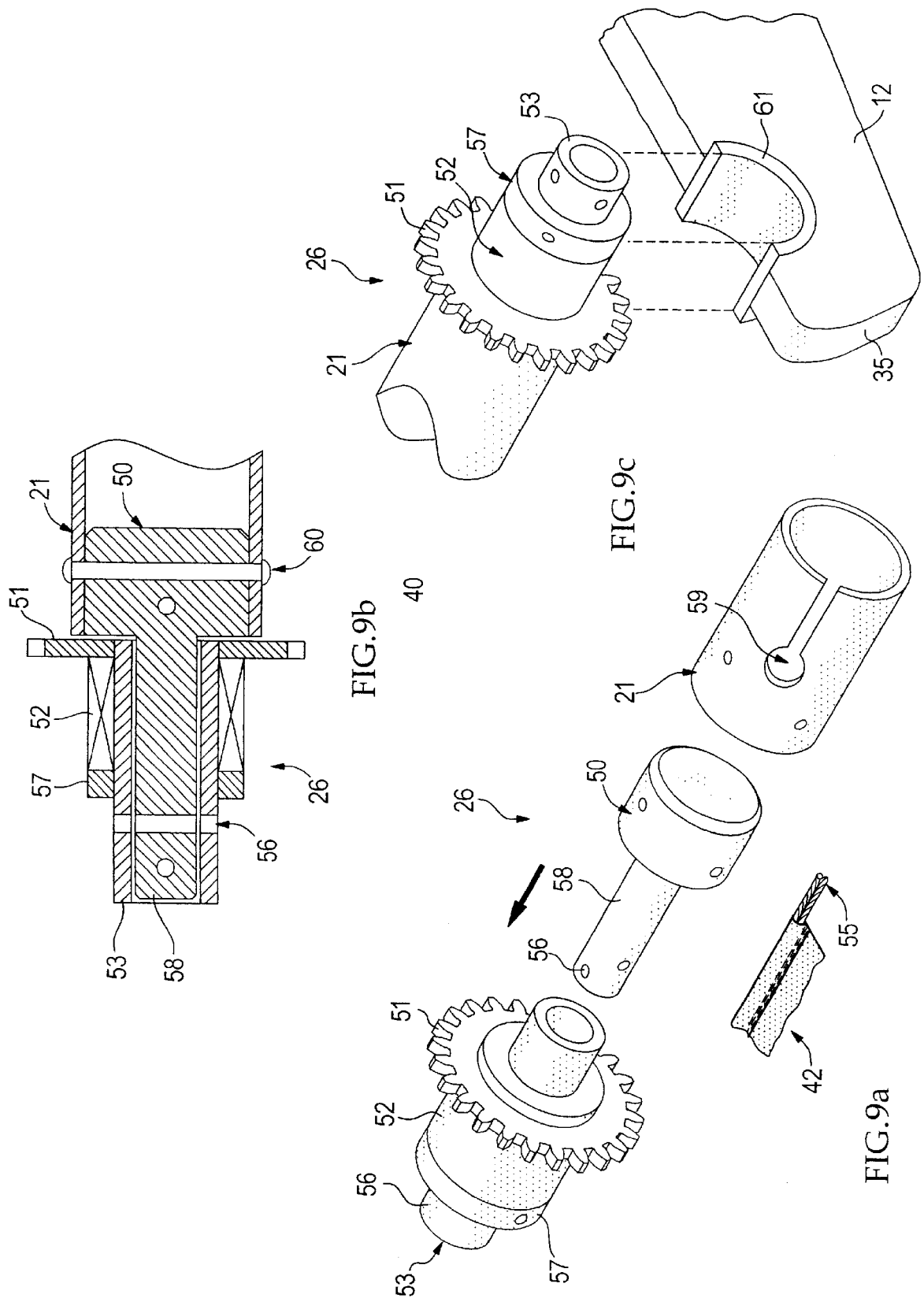
FIGS. 9a, 9b, and 9c show various aspects of a removable cover reel end assembly.

FIG. 9a shows a disassembled view of removable cover reel end assembly 26. Reel end insert 50 fits into cover reel 21. Attached to reel end insert 50 is an end assembly tube insert 58 which extends away from cover reel 21 when reel end insert 50 is inserted into cover reel 21. Reel end insert 50 can be fixed permanently or removably in cover reel 21 by pin 60 which is driven through cover reel 21 and reel end insert 50. End tube assembly 53 removably fits over end assembly tube insert 58 and can be removably fixed by inserting pin through a hole 56 that traverses both end tube assembly 53 and end assembly tube insert 58. End tube assembly 53 has a sprocket 51 and roller bearing 52 with collar 57 rigidly attached. Cover 42 may be inserted into cover reel 21 through cover insert slot 59 using a flexible insert 55 attached to cover 42. FIG. 9b shows the components of removable cover reel end assembly 26 assembled. FIG. 9c shows how roller bearing 52 sits in the bottom portion of bushing assembly 61 at the distal end 35 of pivotal support arm 12. Not shown are attachment means for an upper portion of busing 61 which when joined with bottom portion of bushing 61 will completely reversibly encase roller bearing 52. In this manner, cover reel 21 can rotate freely by means of its connections to reel end insert 50.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, belts and pulleys, or gears and drive shafts, may be used instead of chains and sprockets to wind or unwind the cover reel. The cover may be made of different kinds of materials including cloth or plastic. The cover reel assembly may be used to lay down materials other than covers such as barriers or mesh. Various combinations of pushing or pulling in conjunction with activation of the cover reel motor and transmission may be used. Various components of the cover reel assembly may be made of a variety of materials including metals and plastic.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus for laying or retrieving a ground cover, comprising:
   a) a first frame which can be removably attached to a prime mover;
   b) pivotal support arms having first ends and second ends, said first ends attached to the first frame and said second ends attached rotatably to a cover reel for laying or retrieving said ground cover;
   c) means for raising and lowering said pivotal support arms attached to the first frame wherein said raising and lowering means raise and lower said cover reel, and apply a downward pressing force to press the cover reel onto the ground; and
   d) a second frame attached to said second ends of the pivotal support arms, said second frame having a motor, transmission, and shaft for disengageably driving said cover reel to retrieve the ground cover.

2. An apparatus according to claim 1, wherein said raising and lowering means are attached to said first frame between the prime mover and the first frame.

3. An apparatus according to claim 1, wherein said first ends of said pivotal support arms are attached rotatably to the first frame and said raising and lowering means are attached to the first frame and pivotal support arms.

4. An apparatus according to claim 1, wherein said downward pressing force facilitates a rapid, even, uniform, and aligned laying down of the cover on the ground.

5. An apparatus according to claim 1, wherein said raising and lowering means are hydraulic.

6. An apparatus according to claim 1, wherein said downward pressing force can be produced by the weight of said cover reel independent of said raising and lowering means.

7. An apparatus according to claim 1, further comprising a third frame attached to said second frame, said third frame having a brush/guide mechanism mounted rotatably thereon to guide and clean said ground cover as it is retrieved.

8. An apparatus according to claim 1, further comprising said first frame having a motor, a transmission, and a shaft for disengageable driving cable reels to rewind cables as the ground cover is retrieved, said cables providing a retaining action for said ground cover on the ground.

9. An apparatus according to claim 1, wherein said cover reel has a cover insert slot and said cover has a flexible insert, for attaching the cover to the cover reel.

10. An apparatus for laying or retrieving a ground cover according to claim 1, wherein said cover reel has ends for attaching removable mechanisms, said mechanisms having drive sprockets and roller bearings, said roller bearings contained within bushings in the second ends of the pivotal support arms to allow the cover reel to rotate, and wherein said shaft on the second frame has end sprockets which connect to said drive sprockets to drive said cover reel to retrieve the ground cover.

11. An apparatus for laying or retrieving a ground cover according to claim 10, wherein said end sprockets are connected to said drive sprockets by a chain.

12. An apparatus for laying or retrieving a ground cover according to claim 10, wherein said removable mechanism comprises:
   a) a reel end insert removably attached to said ends on the cover reel, said reel end insert having an end tube assembly insert projecting outward from said ends on the cover reel;
   b) said roller bearing having a collar and drive sprocket, said roller bearing being fixedly attached to an end tube assembly; and
   c) said end tube assembly insert fitting within said end tube assembly and being reversibly fixed therein.

13. An apparatus according to claim 1, wherein said raising and lowering means are pneumatic.

14. An apparatus according to claim 1, wherein said raising and lowering means are a motor and shaft assembly.

15. A method for laying or retrieving a ground cover, comprising:
   a) providing a cover reel assembly removably attached to a prime mover, said cover reel assembly having a cover reel with a ground cover;
   b) lowering said cover reel to the ground using raising and lowering means attached to the cover reel assembly;
   c) applying a downward pressing force to the cover reel with said raising and lowering means to press the ground cover onto the ground;
   d) pushing the cover reel assembly with the prime mover so as to freely unwind said ground cover; and
   e) retrieving said ground cover by attaching the ground cover to the cover reel, and pushing the cover reel assembly with the prime mover.

16. A method according to claim 15, wherein said downward pressing force facilitates a rapid, even, uniform, and aligned laying down of the cover on the ground.

17. A method according to claim 15, wherein said raising and lowering means are hydraulic.

18. A method according to claim 15, wherein said downward pressing force is produced by the weight of said cover reel independent of said raising and lowering means.

19. A method according to claim 15, wherein said cover reel assembly has cable reels with cables which freely unwind as the prime mover pushes the cover reel assembly, laying said cables on to the ground cover, said cables providing a retaining action for said ground cover on the ground.

20. A method according to claim 19, wherein said cables are retrieved by attaching the cables to the cable reels and winding the cables onto the cable reels by activating a motor, transmission, and shaft on the cover reel assembly.

21. A method for laying or retrieving a ground cover according to claim 15, wherein said cover reel has a cover insert slot and said cover has a flexible insert, for attaching the cover to the cover reel, whereby the cover is first inserted through a brush/guide mechanism and then attached to the cover reel.

22. A method for laying or retrieving a ground cover according to claim 15, wherein said cover reel has ends for attaching removable mechanisms, said mechanisms having drive sprockets and roller bearings, said roller bearings contained within bushings in the cover reel assembly to allow the cover reel to rotate, and wherein a shaft on the cover reel assembly has end sprockets which connect to said drive sprockets to drive said cover reel by means of a motor and transmission to retrieve the ground cover.

23. A method for laying or retrieving a ground cover according to claim 22, wherein said end sprockets are connected to said drive sprockets by a chain.

24. A method for laying or retrieving a ground cover according to claim 22, wherein said removable mechanism comprises:
   a) a reel end insert removably attached to said ends on the cover reel, said reel end insert having an end tube assembly insert projecting outward from said ends on the cover reel;
   b) said roller bearing having a collar and drive sprocket, said roller bearing being fixedly attached to an end tube assembly; and
   c) said end tube assembly insert fitting within said end tube assembly and being reversibly fixed therein.

25. A method according to claim 15, wherein said raising and lowering means are pneumatic.

26. A method according to claim 15, wherein said raising and lowering means are a motor and shaft assembly.

27. An apparatus for laying or retrieving a ground cover, comprising:
   a) a first frame removably attached to a prime mover;
   b) a second frame rotatably attached to the first frame, said second frame having a cover reel mounted rotatably thereon and a brush/guide mechanism mounted rotatably thereon;
   c) hydraulic means connected between the first frame and the second frame to raise and lower the second frame;
   d) said first frame having a motor, a transmission, and shaft for disengageably driving said cover reel to retrieve the ground cover;
   e) a third frame attached rotatably to said second frame, said third frame having cable reels with cables, and a motor, a transmission, and shaft for disengageably driving said cable reels to retrieve said cables, said cables providing a retaining action for said ground cover on the ground; and
   f) hydraulic means connected between said first frame and said third frame to lower and raise said third frame to facilitate the laying down or retrieval of said cables.

28. An apparatus for laying or retrieving a ground cover according to claim 27, wherein said cover reel has ends for attaching removable mechanisms, said mechanisms having drive sprockets and roller bearings, said roller bearings contained within bushings in the second frame to allow the cover reel to rotate, and wherein said shaft on the first frame has end sprockets which connect to said drive sprockets to drive said cover reel to retrieve the ground cover.

29. An apparatus for laying or retrieving a ground cover according to claim 28, wherein said end sprockets are connected to said drive sprockets by a chain.

30. An apparatus for laying or retrieving a ground cover according to claim 28, wherein said removable mechanism comprises:
   a) a reel end insert removably attached to said ends on the cover reel, said reel end insert having an end tube assembly insert projecting outward from said ends on the cover reel;
   b) said roller bearing having a collar and drive sprocket, said roller bearing being fixedly attached to an end tube assembly; and
   c) said end tube assembly insert fitting within said end tube assembly and being reversibly fixed therein.

31. An apparatus for laying or retrieving a ground cover according to claim 27, wherein said cover reel has a cover insert slot and said cover has a flexible insert, for attaching the cover to the cover reel.

32. An apparatus for laying or retrieving a ground cover according to claim 27, wherein said hydraulic means between the first frame and the second frame applies a downward pressing force to press the cover reel onto the ground, thereby facilitating and ensuring a rapid, even, uniform, and aligned laying down of the cover on the ground.

33. An apparatus for laying or retrieving a ground cover according to claim 27, wherein said ground cover has a median line and said prime mover has a mirror and roller to visualize the roller on the median line to align the retrieval of the ground cover onto the cover reel.

34. A method for laying or retrieving a ground cover, comprising:
   a) providing a cover reel assembly removably attached to a prime mover, said cover reel assembly having a cover reel with a ground cover, cable reels with cables, and a brush/guide mechanism;
   b) lowering said cover reel to the ground using hydraulic means attached to the cover reel assembly;
   c) applying a downward pressing force to the cover reel with the hydraulic means to press the ground cover onto the ground, thereby facilitating and ensuring an even, uniform, and aligned laying down of the ground cover onto the ground;
   d) securing to the ground said ground cover and said cables;
   e) pulling the cover reel assembly with the prime mover so as to freely unwind said ground cover and cables onto the ground, said cables providing a retaining action for said ground cover on the ground;
   f) retrieving said ground cover by inserting the ground cover through the brush/guide mechanism, attaching the ground cover to the cover reel, and winding the ground cover onto the cover reel by pulling the cover reel assembly with the prime mover; and
   g) retrieving said cables by attaching the cables to the cable reels and winding the cables onto the cable reels by activating a motor, transmission, and shaft on the cover reel assembly.

35. A method for laying or retrieving a ground cover according to claim 34, wherein said cover reel has ends for attaching removable mechanisms, said mechanisms having drive sprockets and roller bearings, said roller bearings contained within bushings in the cover reel assembly to allow the cover reel to rotate, and wherein a shaft on the cover reel assembly has end sprockets which connect to said drive sprockets to drive said cover reel by means of a motor and transmission to retrieve the ground cover.

36. A method for laying or retrieving a ground cover according to claim 35, wherein said end sprockets are connected to said drive sprockets by a chain.

37. A method for laying or retrieving a ground cover according to claim 35, wherein said removable mechanism comprises:
   a) a reel end insert removably attached to said ends on the cover reel, said reel end insert having an end tube assembly insert projecting outward from said ends on the cover reel;
   b) said roller bearing having a collar and drive sprocket, said roller bearing being fixedly attached to an end tube assembly; and
   c) said end tube assembly insert fitting within said end tube assembly and being reversibly fixed therein.

38. A method for laying or retrieving a ground cover according to claim 34, wherein said cover reel has a cover insert slot and said cover has a flexible insert, for attaching the cover to the cover reel.

39. A method for laying or retrieving a ground cover according to claim 34, wherein said ground cover has a median line and said prime mover has a mirror and roller to visualize the roller on the median line to align the retrieval of the ground cover onto the cover reel.

40. A method for laying or retrieving a ground cover according to claim 34, wherein retrieving said ground cover is accomplished by elevating said cover reel with said hydraulic means, inserting the ground cover through the brush/guide mechanism, attaching the ground cover to the cover reel, and winding the ground cover onto the cover reel by activating a motor, transmission, and shaft on the cover reel assembly.

* * * * *